(12) United States Patent
Niranjan et al.

(10) Patent No.: US 8,140,788 B2
(45) Date of Patent: Mar. 20, 2012

(54) APPARATUS, SYSTEM, AND METHOD FOR SELECTING AN INPUT/OUTPUT TAPE VOLUME CACHE

(75) Inventors: Thirumale N. Niranjan, Bangalore (IN); Joseph M. Swingler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 707 days.

(21) Appl. No.: 11/763,340

(22) Filed: Jun. 14, 2007

(65) Prior Publication Data
US 2008/0313403 A1    Dec. 18, 2008

(51) Int. Cl.
G06F 12/00    (2006.01)
(52) U.S. Cl. .................. 711/162; 711/119; 709/219
(58) Field of Classification Search ............ 711/120, 711/130, 4, 113, 162, 119; 718/104, 105; 709/219
See application file for complete search history.

(56) References Cited

U.S. PATENT DOCUMENTS

| | | | |
|---|---|---|---|
| 5,452,440 A * | 9/1995 | Salsburg | 711/136 |
| 6,163,773 A * | 12/2000 | Kishi | 706/16 |
| 6,269,423 B1 * | 7/2001 | Kishi | 711/113 |
| 6,336,172 B1 | 1/2002 | Day, III et al. | 711/161 |
| 6,507,883 B1 * | 1/2003 | Bello et al. | 711/4 |
| 6,507,893 B2 * | 1/2003 | Dawkins et al. | 711/133 |
| 6,526,521 B1 * | 2/2003 | Lim | 714/4 |
| 6,557,073 B1 * | 4/2003 | Fujiwara et al. | 711/111 |
| 6,907,419 B1 | 6/2005 | Pesola et al. | 707/1 |
| 6,983,351 B2 * | 1/2006 | Gibble et al. | 711/159 |
| 7,039,657 B1 * | 5/2006 | Bish et al. | 707/203 |
| 7,136,963 B2 * | 11/2006 | Ogawa et al. | 711/113 |
| 2003/0014568 A1 * | 1/2003 | Kishi et al. | 710/4 |
| 2003/0182350 A1 * | 9/2003 | Dewey | 709/100 |
| 2005/0262296 A1 * | 11/2005 | Peake | 711/111 |
| 2005/0289553 A1 * | 12/2005 | Miki | 718/104 |
| 2006/0149898 A1 | 7/2006 | Bello et al. | 711/111 |

OTHER PUBLICATIONS

Haeusser et al, "IBM TotalStorage Peer-to-Peer Virtual Tape Server Planning and Implementation Guide", Jun. 2006, IBM RedBook, pp. 45-57.*

* cited by examiner

*Primary Examiner* — Jared Rutz
(74) *Attorney, Agent, or Firm* — Kunzler Needham Massey & Thorpe

(57) ABSTRACT

An apparatus, system, and method are disclosed for selecting an input/output tape volume cache (TVC). A history module maintains access history instances for a plurality of clusters. A request module receives an access request for a logical volume. An adjustment module weights the access history instances in favor of recent access history instances. A calculation module calculates an affinity of the logical volume for each cluster of the plurality of clusters. The calculation module may calculate the affinity of the logical volume for each cluster of the plurality of clusters using read/write/scratch granularity and an algorithm. Further, the calculation module may filter out clusters. A selection module selects a cluster TVC with a highest affinity as the TVC for the logical volume.

14 Claims, 6 Drawing Sheets

120 

```
┌─────────────────────────┐
│   Virtualization Node   │
│           210           │
└─────────────────────────┘

┌───────────────────────────────┐
│   Hierarchical Storage Node   │
│              215              │
│  ┌─────────────────────────┐  │
│  │   Cluster Manager 220   │  │
│  └─────────────────────────┘  │
│  ┌─────────────────────────┐  │
│  │  Remote File Access 225 │  │
│  └─────────────────────────┘  │
│  ┌─────────────────────────┐  │
│  │    Data Mover 230       │  │
│  └─────────────────────────┘  │
│  ┌────────┐ ┌──────┐ ┌──────┐ │
│  │Physical│ │Cache │ │Recall│ │
│  │ Tape   │ │Mgr.  │ │Mgr.  │ │
│  │Manager │ │ 240  │ │ 245  │ │
│  │  235   │ │      │ │      │ │
│  └────────┘ └──────┘ └──────┘ │
│  ┌─────────────────────────┐  │
│  │     Database 250        │  │
│  └─────────────────────────┘  │
│  ┌───────────┐ ┌───────────┐  │
│  │Management │ │  Media    │  │
│  │Interface  │ │ Manager   │  │
│  │   255     │ │   260     │  │
│  └───────────┘ └───────────┘  │
└───────────────────────────────┘
```

TVC 265

Library Manager 270

APPARATUS, SYSTEM, AND METHOD FOR SELECTING AN INPUT/OUTPUT TAPE VOLUME CACHE

BACKGROUND OF THE INVENTION

1. Field of the Invention

This invention relates to input/output tape volume caches (TVC) and more particularly relates to selecting a TVC.

2. Description of the Related Art

Storage systems typically include a plurality of tape drives that are used to access a plurality of magnetic tapes. The magnetic tapes may be disposed within cartridges. A library manager controller may direct an actuator to move a tape cartridge from a storage area to a tape drive in order to access data written on the magnetic tape and/or to write data to the magnetic tape.

The storage system may include a plurality of clusters. Each cluster may include a plurality of tape drives. Magnetic tapes are mounted to the tape drives in order to read data from and write data to the magnetic tapes.

Each magnetic tape may be organized as one or more logical volumes. A logical volume may appear to a host as a distinct storage device. A logical volume may be logically "mounted" on a virtual tape drive. As used herein, a virtual tape drive is a logical construct that appears to a host as a tape drive.

Operations such as read operations and write operations for a virtual tape drive mounting a logical volume may be routed through a TVC. The TVC may include a rapidly accessible storage device such as a hard disk drive. The storage device may cache data to the TVC. Thus the TVC may cache data that is read from the logical volume and/or cache data that is to be written to the logical volume. For example, a host may make repeated writes to a logical volume. The TVC may store the written data on a hard disk drive without writing the data to the logical volume's magnetic tape. At a later time, the TVC may write the cached data to the magnetic tape.

Storage systems may maintain multiple consistent copies of logical volumes. Two or more clusters with consistent copies may be able to provide access to the logical volumes. Unfortunately, a host has no way of determining which of the TVCs could be used most advantageously to access a specified logical volume.

SUMMARY OF THE INVENTION

From the foregoing discussion, there is a need for an apparatus, system, and method that selects a TVC. Beneficially, such an apparatus, system, and method would enable storage systems to automatically select the TVC.

The present invention has been developed in response to the present state of the art, and in particular, in response to the problems and needs in the art that have not yet been fully solved by currently available storage systems. Accordingly, the present invention has been developed to provide an apparatus, system, and method for selecting the TVC that overcome many or all of the above-discussed shortcomings in the art.

The apparatus to select a TVC is provided with a plurality of modules configured to functionally execute the steps of maintaining access history instances, receiving an access request, weighting the access histories, calculating an affinity, and selecting a cluster TVC. These modules in the described embodiments include a history module, a request module, an adjustment module, a calculation module, and a selection module.

The history module maintains access history instances for a plurality of clusters. The request module receives an access request for a logical volume. The adjustment module weights the access histories in favor of recent access history instances. The calculation module calculates an affinity of the logical volume for each cluster of the plurality of clusters. The selection module selects a cluster TVC with a highest affinity as the TVC for the logical volume. The apparatus selects the TVC that will likely include a cached portion of the logical volume.

A system of the present invention is also presented for selecting a TVC. The system may be embodied in a storage system. In particular, the system, in one embodiment, includes a plurality of clusters and a cluster manager. Each cluster of the plurality of clusters comprises a TVC and a virtual tape drive. The cluster manager of the system includes a processor, a memory, and a computer readable program.

The processor and the memory of the cluster manager execute software readable programs. The software readable programs of the cluster manager comprise a history module, a request module, an adjustment module, a calculation module, and a selection module.

In an embodiment, the virtual tape drive mounts a logical volume. All operations for the virtual tape drive mounting the logical volume are routed to the TVC.

The history module maintains access history instances for a plurality of clusters. Each access history instance comprises a last write time stamp, a last read time stamp, a last scratch mount time stamp, a last TVC read time stamp, a last TVC write time stamp, and a last TVC scratch mount time stamp.

The request module receives an access request for a logical volume. The adjustment module weights the access histories in favor of recent access history instances. The calculation module calculates an affinity of the logical volume for each cluster of the plurality of clusters. The calculation module may calculate the affinity of the logical volume for each cluster of the plurality of clusters using one or the other algorithm. The selection module selects a cluster TVC with a highest affinity as the TVC for the logical volume. The system selects the cluster with the highest affinity as the TVC for the logical volume.

A method of the present invention is also presented for selecting a TVC. The method in the disclosed embodiments substantially includes the steps to carry out the functions presented above with respect to the operation of the described apparatus and system. In one embodiment, the method includes maintaining access history instances, receiving an access request, weighting the access histories, calculating an affinity, and selecting a cluster. The method may further include filtering out clusters.

A history module maintains access history instances for a plurality of clusters. A request module receives an access request for a logical volume. An adjustment module weights the access histories in favor of recent access history instances. A calculation module calculates an affinity of the logical volume for each cluster of the plurality of clusters. A selection module selects a cluster TVC with a highest affinity as the TVC for the logical volume.

In an embodiment, the request module routes all operations for a virtual tape drive mounting the logical volume to the TVC. The calculation module may calculate the affinity of the logical volume for each cluster of the plurality of clusters using read/write/scratch granularity and an algorithm.

In one more embodiment, the calculation module filters out clusters. The filtered out clusters may include unavailable clusters, clusters that are anticipated to be unavailable, and clusters that have copies of the volume that are inconsistent. The calculation module may exclude all history for scratch mounts when calculating each affinity. The method would automatically calculate the affinity of the logical volume for each cluster of the plurality of clusters using read/write/scratch granularity and the algorithm. Thus the method enables an automatic selection of the TVC for the logical volume.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention provides an apparatus, a system, and a method for selecting a TVC. Beneficially, such an apparatus, a system, and a method would automatically enable the storage system to select the cluster TVC with the highest affinity as the TVC for the logical volume. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 2 is a schematic block diagram illustrating one embodiment of a cluster of the present invention;

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays (FPGAs), programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within the modules, and may be embodied in any suitable form and organized within any suitable type of data structure. The operational data may be collected as a single data set, or may be distributed over different locations including different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
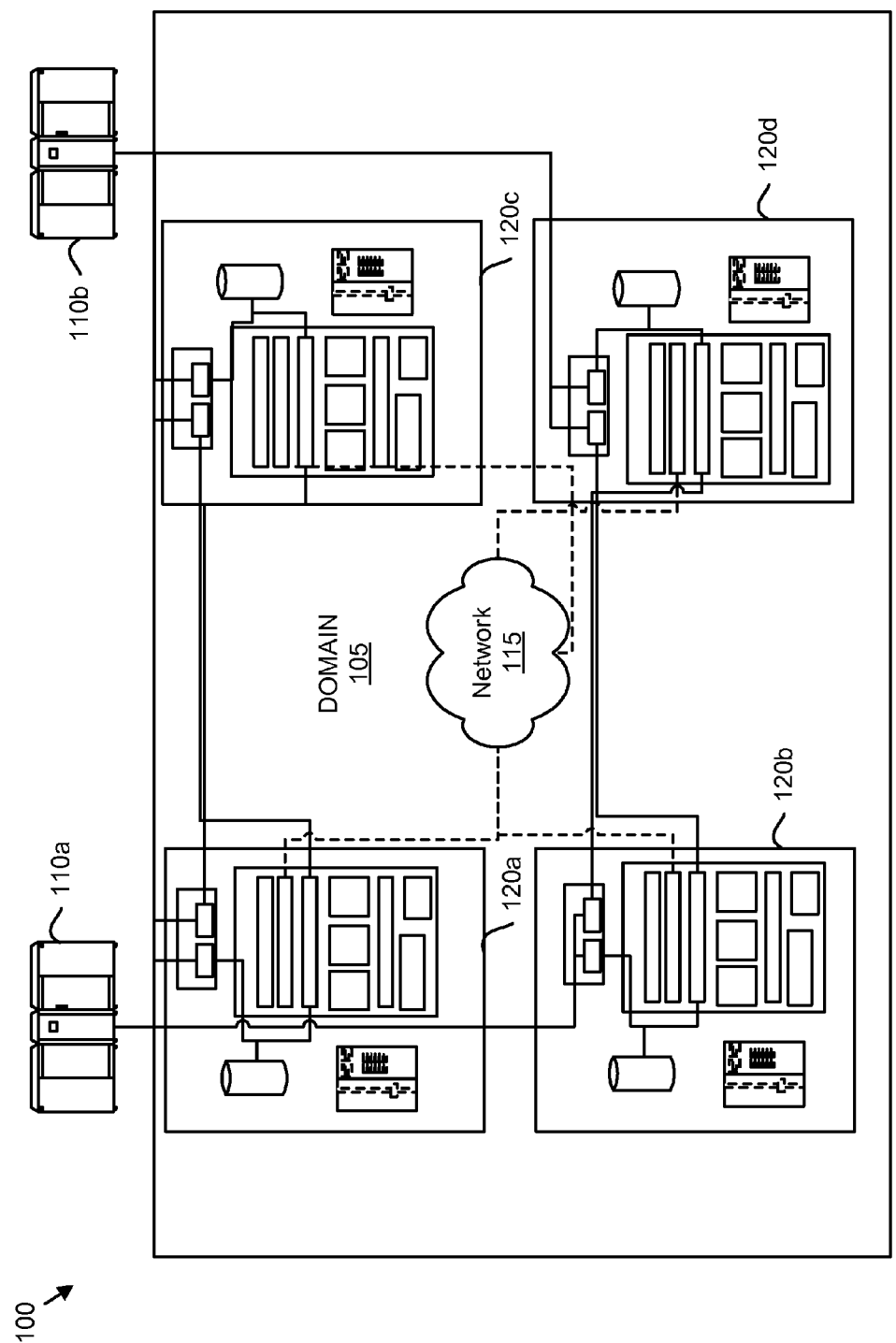
FIG. 1 is a schematic block diagram illustrating one embodiment of a storage system in accordance with the present invention.

FIG. 1 is a schematic block diagram illustrating one embodiment of a storage system 100 in accordance with the present invention. The storage system 100 includes a plurality of hosts 110, a plurality of clusters 120, and a network 115. Although for simplicity, two (2) hosts 110(*a, b*), four (4) clusters 120(*a, b, c, d*), and one (1) network 115 are shown, any number of hosts 110, clusters 120, and networks 115 may be employed.

The hosts 110(*a, b*) may initiate and run all tape jobs wherein data is to be read from and/or the data is to be written to a plurality of logical volumes through the plurality of clusters 120 on the storage system 100. The hosts 110 may be mainframe computers or the like with high-speed processors. The hosts 110 may have the ability to run or host multiple operating systems. For example, the hosts 110 may run or host multiple operating systems such Linux, Java, MICROSOFT WINDOWS® or the like. Each of the hosts 110 of the storage system 100 may operate as the single mainframe computer or as number of virtual machines. The hosts 110 may provide three levels of virtualization through logical partitions (LPARs) via the facility, through virtual machines via the z/VM operating system, and through operating systems, notably z/OS produced by International Business Machines Corporation of Armonk, N.Y., with key-protected address spaces and goal-oriented workload scheduling.

The hosts 110 may communicate with the clusters 120 over the network 115 to access plurality of tape drives, disk drives, other storage devices, and/or the like through one or more storage controllers. The cluster 120 may be a hierarchical storage controller. For example, the host 110a may communicate over the network 115 to access the logical volume through the cluster 120a.

The clusters 120 may provide a single point management of the data to be read/stored using aggregated storage pools in which storage can easily be allocated to the different hosts 110, scalability in growing the storage system 100 by adding storage devices or storage control nodes, and a platform for implementing advanced functions such a as fast-write cache, a point-in-time copy, a transparent data migration, and a remote copy.

The clusters 120 may follow an "in-band" approach to read/scratch/write the data. The in-band approach may cause all I/O requests and all management and configuration requests to be processed through for instance the third cluster 120c and/or are to be serviced by the third cluster 120c.

Each cluster 120 of the plurality of the clusters 120(a, b, c, d) may be interconnected between themselves and with the hosts 110 over the network 115 to access the data from the logical volumes and/or to write data to the logical volumes through the clusters 120.

The network 115 may be storage area network (SAN), a token ring network, or the like. The SAN may consist of a plurality of "fabric" through whom the hosts 110 may communicate with any of the cluster 120. The fabric may include a Fibre Channel network, an Ethernet network, or the like. All components may not share the same fabric for communication. For example, the host 110a may communicate with the first cluster 120a over one fabric and with the third cluster 120c over another fabric.

The plurality of interconnected clusters 120 over the network 115 may form a domain 105. For example, in the depicted embodiment four (4) interconnected clusters 120 may form the domain 105 of the storage system 100.

FIG. 2 is a schematic block diagram illustrating one embodiment of a cluster 120 of the present invention. The cluster 120 is a cluster 120 of FIG. 1. The description of the cluster 120 refers to elements of FIG. 1, like numbers referring to like elements. The cluster 120 may include a virtualization node 210, a hierarchical storage node 215, a TVC 265, and a library manager 270.

Hosts 110 may initiate and run all tape jobs on the cluster 120. For example, the host 110a may direct an actuator of the library manager 270 through the physical tape manager 235 to move a tape cartridge from a storage area to a virtual tape drive in order to access or scratch the data from a logical volume and/or to write the data to the logical volume through the cluster 120.

The virtualization node 210 may be an independent processor based server with multiple connections to the network 115. The virtualization node 210 may include either a battery backup unit (BBU) and/or may have access to an uninterruptible power supply (UPS). The virtualization node 210 may also include a watchdog timer. The watchdog timer may ensure restart of the failing virtualization node 210 if the virtualization node 210 that is not able to recover and/or takes a long time to recover.

The virtualization node 210 may include one or more tape daemon (not shown). The tape daemon may emulate a virtual tape drive to the hosts 110. The tape daemon may operate on a file that is either on a local TVC 265 and/or on the file in a remote TVC 265 through a remote file access 225.

The hierarchical storage node 215 may include a cluster manager 220, the remote file access 225, a data mover 230, the physical tape manager 235, a cache manager 240, a recall manager 245, a database 250, a management interface 255, and a media manager 260.

The cluster manager 220 may coordinate all I/O operations between the plurality of clusters 120 in a grid topology. The cluster manager 220 may use tokens to determine which cluster 120 of the plurality of the clusters 120(a, b, c, d) has a current copy of the data. The tokens may be information in the form of access addresses of the data or the like. The tokens may be stored in and/or accessed from the database 250. The cluster manager 220 may also coordinate copying data between the clusters 120. The cluster manager 220 may include a computer readable program.

The remote file access 225 may be a server with one or more processors, or the like. The remote file access 225 may provide a link to the TVC 265 for access by any remote cluster 120. For example, the remote file access 225 may provide the link to the TVC 265 for access by the fourth remote cluster 120d.

The data mover 230 may control the actual data transfer operations between the plurality of the clusters 120. The data mover 230 may also control operation of the data transfer between the logical volume and the TVC 265. For example, the data mover 230 may control the operation of the data transfer between the magnetic tape storing the logical volume and the TVC 265. The data mover 230 may include a computer readable program.

The physical tape manager 235 may control the plurality of logical volumes in the clusters 120. The physical tape manager 235 may manage the plurality of logical volumes in multiple pools, reclamation, borrowing and returning of the logical volumes from and to a common scratch pool, and movement of the logical volumes between the pools. For example, the physical tape manager 235 may manage the borrowing and returning of the logical volumes from and to the cluster 120c that may act as the common scratch pool for the plurality of clusters 120. The physical tape manager 235 may include a computer readable program.

The cache manager 240 may control copying of the data from the TVC 265 to the logical volumes and subsequent scratch the redundant copy of the data from the TVC 265. The cache manager 240 may also provide control signals to balance the data flow between the plurality of the clusters 120 and the TVC 265. The cache manager 240 may include a computer readable program.

The recall manager 245 may queue and control an operation of recalling of the data into the TVC 265 from the logical volumes for either the virtual tape drive or for the copies requested by the cluster manager 220. For example, the recall manager 245 may queue and control the operation of recalling of the data into the TVC 265 from the second logical volume through the third cluster 120c for a virtual tape drive. The recall manager 245 may include a computer readable program.

The database 250 may be a structured collection of records. The database 250 may be stored on a hard disk drive. The records may include the data stored on the logical volumes, addresses of locations of the data on the logical volumes, the tokens or the like. The host 110 may write the data to the logical volumes through the cluster 120 and/or may access the data from the logical volumes through the clusters 120 by using database addresses.

The management interface 255 may provide information on the plurality of the clusters 120 to a user. Also, the management interface 255 may allow the user to control and configure the clusters 120. The management interface 255 may include a computer cathode ray tube (CRT), a liquid crystal display (LCD) screen, or the like.

The media manager 260 may manage the physical handling of the logical volumes. The media manager 260 may also manage error recovery of the logical volumes. The media manager 260 may diagnose errors and may further determine if the errors are caused by the tape drives or by the logical volumes. Further, the media manager 260 may automatically initiate diagnostic actions for any error recovery. The media manager 260 may include a computer readable program.

The library manager 270 may include plurality of tape drives, a robotic accessor, and a plurality of the logical volumes. The tape drives may read data from and write data to magnetic tape as is well known to those skilled in the art. The library manager 270 may include a logical tape drive. The virtual tape drive may be a logical construct that may appear to the host 110 as the actual tape drive. The data may be read or scratched from or written to the logical volumes of the tape drive through a read/write channel as is well known to those skilled in the art.

The clusters 120 may employ any number of the tape drives and any number of the logical volumes. For example, the storage system 100 may employ two (2) tape drives and two hundred fifty six (256) logical volumes. The logical volumes in the TVC 265 may be managed using a first-in-first-out (FIFO) and/or least recently used (LRU) algorithm.

The TVC 265 may be a rapidly accessible storage device. For example, the TVC 265 may be a hard disk drive with a storage capacity of five thousand four hundred gigabytes (5400 GB) or the like. The high-availability fast-write storage of the TVC 265 may allow the host 110 to write the data to the TVC 265 without having to wait for the data to be written to a physical volume.

The I/O operations such as read operations and write operations for the virtual tape drive mounting the logical volume may be routed through the TVC 265. In the storage system 100, the tape drive may cache the data to the TVC 265 that is to be read from the logical volumes and/or to be written to the logical volume. For example, the host 110 may make repeated writes to the virtual tape drive. The TVC 265 may also store the written data on the hard disk drive without writing the data to a physical volume. At a later time, the TVC 265 may write the cached logical volume data to a physical volume of the cluster 120.

A second instance of the logical volume on the second cluster 120b may be created from a first instance of the logical volume on the first cluster 120a. The first cluster 120a with the first instance of the data may be a local cluster 120. The second cluster 120b with the second instance of the data may be a remote cluster 120. The second instance of the logical volume may be synchronized with the first instance, wherein the second instance may be updated any time the primary instance is updated. The second instance may be stored at a remote site in order to ensure availability of the data in case the primary instance becomes unavailable. The data mover 230 may use transparent data migration while adding, removing, and/or rebalancing data to logical volumes.

The TVC 265 that accessed the logical volume may be a mount-point. Choosing a remote TVC 265 that was a recent mount-point for the logical volume may improve access to the logical volume.

Figure 3:
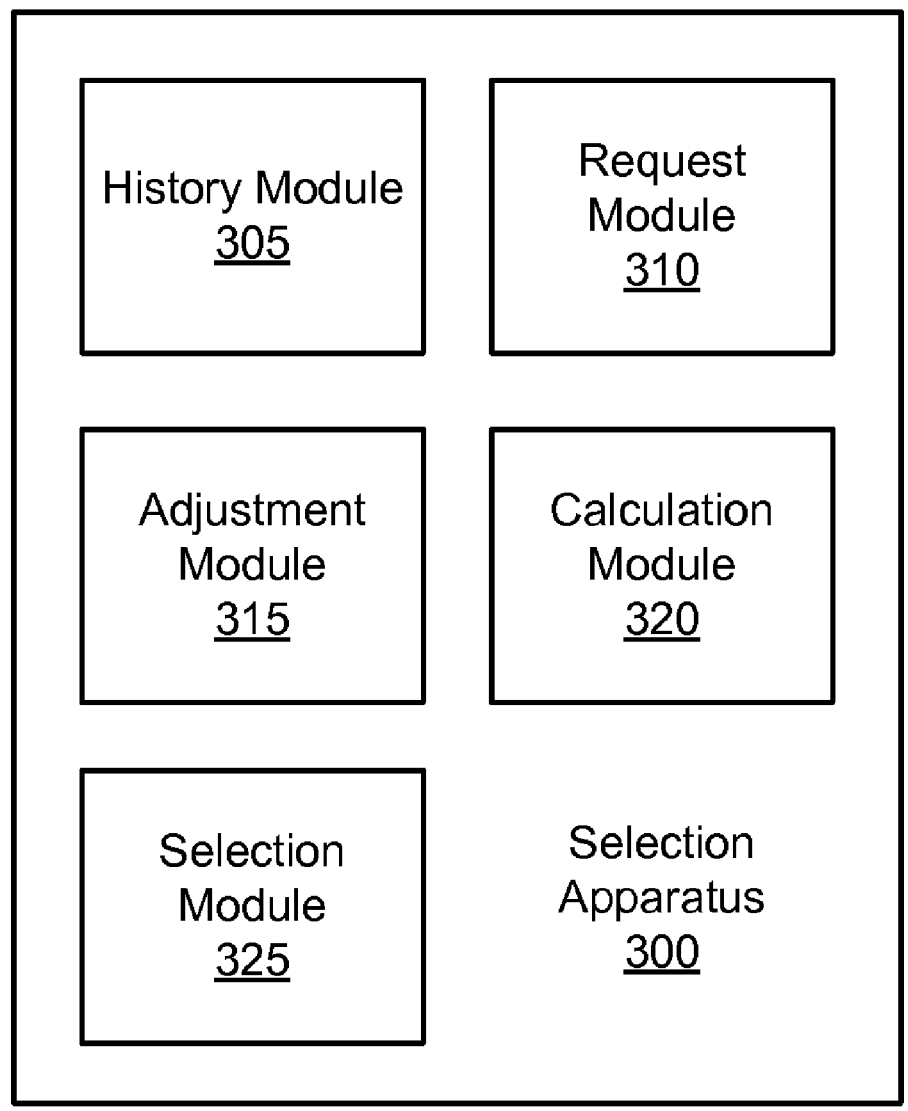
FIG. 3 is a schematic block diagram illustrating one embodiment of a selection apparatus of the present invention.

FIG. 3 is a schematic block diagram illustrating one embodiment of a selection apparatus 300 of the present invention. The apparatus 300 enables selection of a TVC 265 and can be embodied in the storage system 100 of FIG. 1. The description of the apparatus 300 refers to elements of FIGS. 1 and 2, like numbers referring to like elements. The apparatus 300 includes a history module 305, a request module 310, an adjustment module 315, a calculation module 320, and a selection module 325.

The history module 305, the request module 310, the adjustment module 315, the calculation module 320, and the selection module 325 may be organized as one or more software readable programs executing on the cluster manager 220. The cluster manager 220 may include a processor and a memory that execute the software readable programs.

The history module 305 maintains access history instances for a plurality of clusters 120. Has used herein, maintaining refers to storing and organizing access history information. Each cluster 120 may be the cluster 120 of FIG. 2. Each access history instance may include information for an I/O operation in the form of the data accessed or stored, a day and time of the I/O operation, and a cluster identifier (ID) to a logical volume as will be described hereafter. The history module 305 may include a software readable program.

In an embodiment, each access history instance comprises a last write time stamp. For example, the history module 305 may store information on all the last writes to all the logical volumes through each of the clusters 120 in the form of the data written, the day and time of the write, and the cluster ID.

The access history instance may comprise a last read time stamp. For example, the history module 305 may store information on all the last reads from all the logical volumes through each of the clusters 120 in the form of the data read, the day and time of the read, and the cluster ID.

In another embodiment, the access history instance comprises a last scratch mount time stamp. For example, the history module 305 may store information on all the last scratches from all the logical volumes through each of the clusters 120 in the form of the day and time of the scratch mount and the cluster ID.

The access history instance may comprise a last TVC read time stamp. For example, the history module 305 may store information on all the last reads from all the TVCs 265 through each of the clusters 120 in the form of the data read, the day and time of the TVC read, and the cluster ID.

In one more embodiment, the access history instance comprises a last TVC write time stamp. For example, the history module 305 may store information on all the last writes to all the TVCs 265 through each of the clusters 120 in the form of the data written, the day and time of the TVC write, and the cluster ID.

The access history instance may comprise a last TVC scratch mount time stamp. For example, the history module 305 may store information on all the last scratch mounts for all the TVCs 265 through each the clusters 120 in the form of the day and time of the scratch mount and the cluster ID.

The request module 310 receives an access request for a logical volume. Any one of the hosts 110 may initiate the access request for the data. The cluster manager 220 may access a token or an address of a location of the data from the database 250 to determine the clusters 120 having the consistent copy of the data. For example, the request module 310 may receive the access request for the first logical volume. The request module 310 may include a software readable program.

The adjustment module 315 weights the access history instances in favor of recent access history instance. For example, the adjustment module 315 may weight the last write time stamps in favor of recent access history instances. The adjustment module 315 may include a software readable program.

The calculation module 320 calculates an affinity of the logical volume for each cluster 120 of the plurality of clusters 120. The calculation module 320 may use one or another algorithm to calculate the affinity of the logical volume for each cluster 120 of the plurality of clusters 120. For example, the calculation module 320 may calculate the affinity of the first logical volume for each of the clusters 120(a, b, c, d). In a more particular example, the calculation module 320 may calculate the affinity of the value of seven (7) of the first logical volume for the first cluster 120a and the affinity of the value of nine (9) of the first logical volume for the second cluster 120b.

Alternatively, the calculation module 320 may calculate the affinity using read/write/scratch granularity. For example, if an I/O operation is always to read the data from the first cluster 120a and write the data to the fourth cluster 120d, then the calculation module 320 may calculate the highest affinity of the logical volume for the first cluster 120a. The calculation module 320 may include a software readable program.

The selection module 325 selects a cluster TVC 265 with a highest affinity as a TVC 265 for the logical volume. For example, the selection module 325 may select the second cluster TVC 265 as the TVC 265 for the first logical volume. The selection module 325 may include a software readable program.

Figure 4:
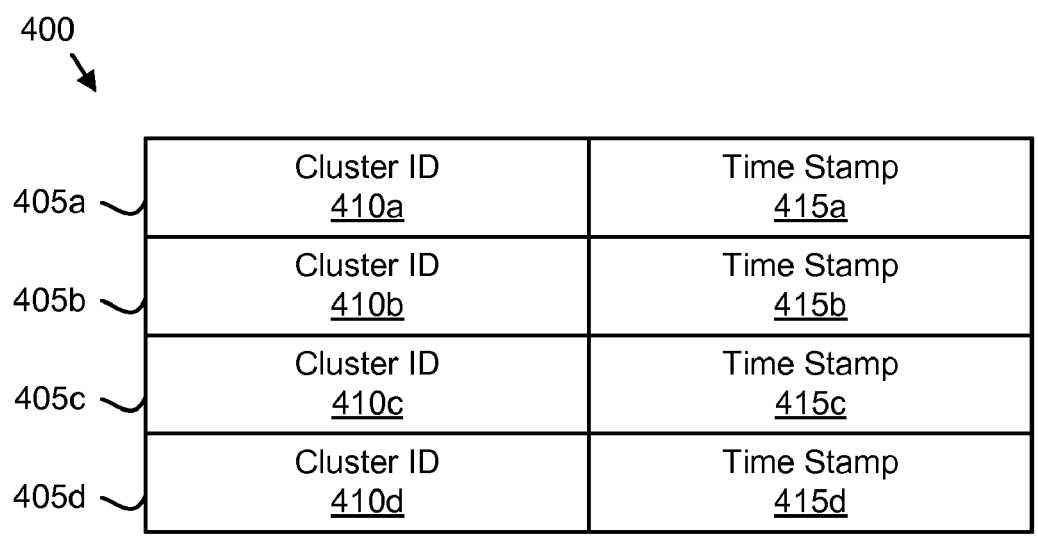
FIG. 4 is a drawing illustrating one embodiment of an access history of the present invention.

FIG. 4 is a drawing illustrating one embodiment of an access history 400 of the present invention. The description of the access history 400 refers to elements of FIGS. 1, 2, and 3, like numbers referring to like elements. In the depicted embodiment, the access history 400 is organized as an array of plurality of access history instances 405(a, b, c, d) for a logical volume.

The first column of each access history instance 405 represents a cluster ID 410. The second column of the each access history instance 405 represents a time stamp 415. Although for simplicity, one (1) time stamp 415 is shown, any number and type of time stamps 415 may be employed. The time stamp 415 may be the last write time stamp, the last read time stamp, the last scratch mount time stamp, the last TVC read time stamp, the last TVC write time stamp, and the last TVC scratch mount time stamp.

In the depicted embodiment, a first access history instance 405a includes a first cluster ID 410a and a first time stamp 415a, a second access history instance 405b includes a second cluster ID 410b and a second time stamp 415b, a third access history instance 405c includes a third cluster ID 410c and a third time stamp 415c, and a fourth access history instance 405d includes a fourth cluster ID 410d and a fourth time stamp 415d for the logical volume.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and the symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
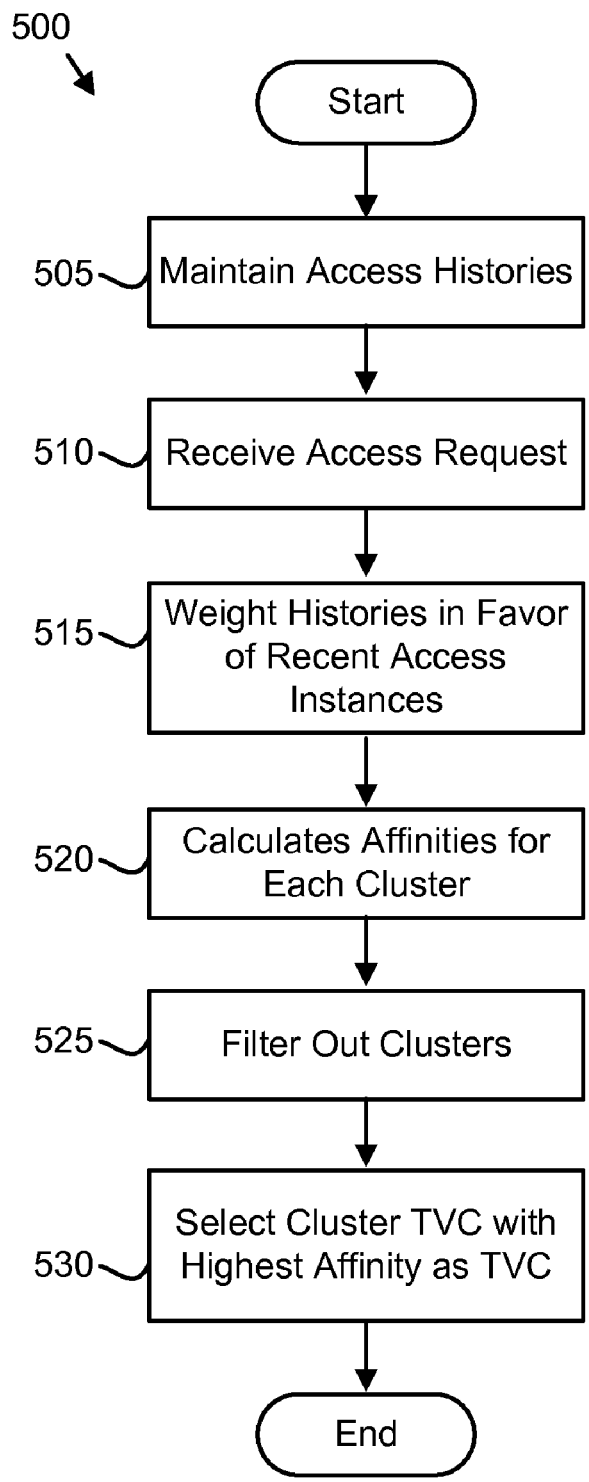
FIG. 5 is a schematic flow chart diagram illustrating one embodiment of a method for selecting a TVC of the present invention.

FIG. 5 is a schematic flow chart illustrating one embodiment of a method 500 for selecting a TVC 265. The method 500 substantially includes the steps to carry out the functions presented above with respect to the operation of described storage system 100, cluster 120, apparatus 300, and access history 400 of FIGS. 1, 2, 3, and 4. The description of method 500 refers to elements of FIGS. 1, 2, 3, and 4, like numbers referring to the like elements. In one embodiment, the method is implemented with a processor program product comprising a processor readable medium having a computer readable program. The computer program product in combination with the computing system may be capable of performing the method 500. The computer program readable medium may be executed by the cluster manager 220 and/or the hosts 110.

The method 500 starts and in an embodiment, the history module 305 maintains 505 access history instances 405 for a plurality of clusters 120. The each access history instance 405 may comprise a last write time stamp, a last read time stamp, a last scratch mount time stamp, a last TVC read time stamp, a last TVC write time stamp, and a last TVC scratch mount time stamp.

In one example, the history module 305 may automatically maintain 505 the last write time stamp 415 for the first cluster 120a, wherein the time stamp may record the data last written, at thirteen point three five (13.35) hours on first (1st) December of two thousand six (2006), and the cluster ID 410 for the first cluster 120a.

The request module 310 receives 510 an access request for a logical volume. For example, the request module 310 may receive the access request for the first logical volume. Copies of the first logical volume may reside on two or more clusters 120. Each consistent copy of the logical volume may have consistent copy of the data. For example, copies of the first logical volume may reside on the third cluster 120c and the fourth cluster 120d.

The adjustment module 315 weights 515 the access history instances 405 in favor of recent access history instances 405. For example, the adjustment module 315 may weight the last read time stamps 415 for each cluster 120 of the plurality of the clusters 120(a, b, c, d) in favor of recent access history instances 405.

The calculation module 320 calculates an affinity of the logical volume for each cluster 120 of the plurality of clusters 120(a, b, c, d). In an embodiment, the calculation module 320 calculates 520 the each affinity a as illustrated in Equation 1, where n is a number of access history instances 405 for the cluster 120, k is a constant, $t_0$ is a current time, and $t_i$ is time stamp for access history instance i for the same cluster 120.

$$a = \sum_{i=1}^{n} \frac{k}{(t_0 - t_i)}.$$ Equation 1

In one embodiment, the constant k may be of the value of one hundred eleven point sixty five (111.65). The access history instances 405 may comprise the last write time stamps, the last read time stamps, the last scratch mount time stamps, the last TVC read time stamps, the last TVC write time stamps, and/or the last TVC scratch mount time stamps. The number of access history instances n may be of any value, for instance n=10 when ten (10) access history instances 405 used. The values, $t_1, t_2, t_3, \ldots t_n$ may be instances of write time stamps.

In another embodiment, the calculation module 320 may calculate 520 the each affinity a as shown in Equation 2, where each k is a constant for a specified access history instance of the cluster 120, $t_0$ is a current time, $t_1, t_2, t_3, \ldots t_n$ are last read time stamps of access history instances 405 of the same cluster 120, and n is a number of access history instances 405 of the same cluster 12.

$$a = k_1(t_0-t_1)^n + k_2(t_0-t_2)^{n-1} + k_3(t_0-t_3)^{n-2} \ldots + k_n(t_0-t_n)$$ Equation 2.

In one embodiment, the constants k may be in the range of minus hundred (−100) to two hundred (200). The access history instances 405 may comprise the last read time stamps and the last TVC read time stamps. The number of access history instances n may be of any value, for instance n=5 (five).

The calculation module 320 may exclude all history and consistency checks for scratch mounts when calculating 520 each affinity. For example, the calculation module 320 may calculate 520 affinity value of zero (0) for all scratch mounts. In another example, the calculation module 320 may calculate 520 the affinity of the value of zero point one (0.1) of the first logical volume for the first cluster 120a, the affinity of the value of zero point five (0.5) of the first logical volume for the second cluster 120b, the affinity of the value of zero point two (0.2) of the first logical volume for the third cluster 120c, and the affinity of the value of zero point zero nine (0.09) of the first logical volume for the fourth cluster 120d.

Alternatively, the calculation module 320 may calculate 520 the each affinity using read/write/scratch granularity. For example, if an I/O operation is always to read the data from the third logical volume through the cluster 120a and may usually write the data to the second logical volume through the cluster 120d, then the calculation module 320 may calculate 520 the highest affinity of the third logical volume for the first cluster 120a.

Further, the calculation module 320 may filter out 525 the clusters 120 that are unavailable or anticipated to be unavailable as will be described hereafter. For example, the calculation module 320 may filter out 525 the fourth cluster 120d that may not be available for access.

The selection module 325 selects 530 the cluster 120 with a highest affinity as the TVC cluster 120 for the logical volume. Continuing example above, the selection module 325 may select 530 the second cluster 120b TVC 265 as the TVC 265 for the first logical volume as the TVC 265 with the highest affinity of zero point five (0.5).

Figure 6:
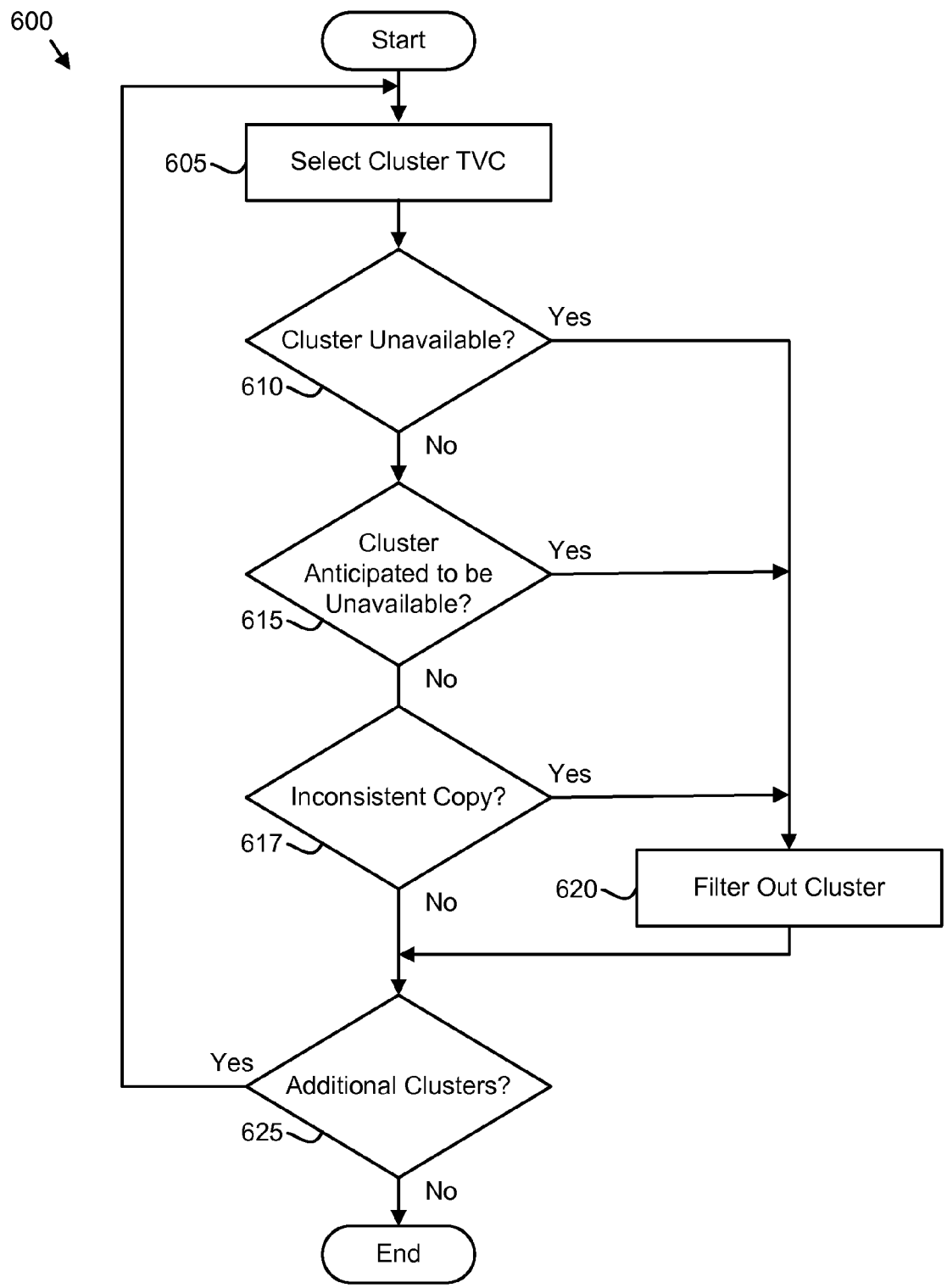
FIG. 6 is a schematic flow chart diagram illustrating one embodiment of a method for filtering out clusters of the present invention.

FIG. 6 is a schematic flow chart illustrating one embodiment of the method 600 for filtering out clusters 120. The method 600 substantially includes the steps to carry out the functions presented above with respect to the operation of described storage system 100, cluster 120, apparatus 300, access history 400, and method 500 of FIGS. 1-5. The description of method 600 refers to elements of FIGS. 1-5, like numbers referring to the like elements. In one embodiment, the method 600 for filtering out clusters 120 is embodied in step 525 of the method 500.

The method 600 starts and in an embodiment the calculation module 320 selects 605 a TVC 265 of a cluster 120. For example, the calculation module 320 may select 605 the TVC 265 of the first cluster 120a.

The calculation module 320 may determine 610 that the selected cluster 120 is unavailable. The selected cluster 120 may be unavailable because the cluster 120 is off-line. For example, the calculation module 320 may determine 610 that the selected cluster 120a is unavailable for an access of the data from a plurality of the logical volumes and/or for storage of the data to the plurality of logical volumes through the selected cluster 120a.

If the calculation module 320 determines 610 that the selected cluster 120 is not unavailable, the calculation module 320 may further determine 615 if the selected cluster 120 is anticipated to be unavailable. The selected cluster 120 may be anticipated to be unavailable due to scheduled maintenance. For example, the calculation module 320 may determine 615 that the selected cluster 120a is not anticipated to be unavailable for the access of the data from a plurality of the logical volumes and/or for storage of the data to the plurality of the logical volumes through the selected cluster 120a.

If the selected cluster 120 is not anticipated to the unavailable, the calculation module 320 determines 617 if the selected cluster 120 has an inconsistent copy of the logical volume. The selected cluster 120 may have the inconsistent copy of the logical volume, if the copy of the logical volume on the selected cluster 120 has not been updated when the source logical volume is updated and is not a scratch mount.

If the calculation module 320 determines 610 that the selected cluster 12O is unavailable, determines 615 that the selected cluster 120 is anticipated to be unavailable, and/or determines 617 that the selected cluster 120 has the inconsistent copy of the logical volume, the calculation module 320 may filter out 620 the selected cluster 120. For example, if the calculation module 320 determines 615 that the selected cluster 120a is anticipated to be unavailable, the calculation module 320 may filter out 620 the selected cluster 120a. In another example, if the calculation module 320 determines 610 that the selected cluster 120a is unavailable, the calculation module 320 may filter out 620 the selected cluster 120a as not available. In one more example, if the calculation module 320 determines 617 that the selected cluster 120a has the inconsistent copy of the logical volume, the calculation module 320 may filter out 620 the selected cluster 120a as not available. Alternatively, the calculation module 320 may filter out 620 the selected cluster 120a if the selected cluster 120a have copies of the logical volume that are inconsistent and the access is not scratch based.

Further, if the calculation module 320 determines 610 that the selected cluster 120 is available, determines 615 that the selected cluster 120 is anticipated to be available, and/or determines 617 that the selected cluster 120 has the consistent copy of the logical volume, the calculation module 320 may further determine 625 if there are additional clusters 120 to be filtered. The additional clusters 120 may be filtered for quick and reliable access for the data. For example, the calculation module 320 may determine 625 additional clusters 120 are to be filtered. In another example, the calculation module 320 may determine 625 additional clusters 120 are not to be filtered.

If the calculation module 320 determines 625 that there are no additional clusters 120 to be filtered, the method 600 may terminate. If the calculation module 320 determines 625 that there are additional clusters 120 to be filtered, the method 600 may loop to the step 605. Similarly, the method 600 may check the availability for all the clusters 120 for access of the data of the storage system 100. Thus the method 600 would automatically filter out the clusters 120 that are not available or otherwise should not be selected.

The present invention provides an apparatus, a system, and a method for selecting a TVC. Beneficially, such an apparatus, a system, and a method would automatically enable the storage system to select the cluster with the highest affinity as the TVC for the logical volume. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for selecting an input/output tape volume cache (TVC), the apparatus comprising:
a memory device storing a computer readable program;
a processor executing the computer readable program, the computer readable program comprising
a history module maintaining access history instances for a plurality of clusters, each cluster comprising a TVC;
a request module receiving an access request for a logical volume wherein an instance of the logical volume is stored on each of the plurality of clusters and each instance of the logical volume is synchronized with each other instance of the logical volume;
an adjustment module weighting the access history instances in favor of recent access history instances;
a calculation module calculating an affinity of the logical volume instance stored on each cluster of the plurality of clusters, wherein each affinity a is calculated as $$a = \sum_{i=1}^{n} \frac{k}{(t_0 - t_i)}$$

where n is a number of access history instances, k is a constant, $t_0$ is a current time, and $t_i$ is a last read time stamp for access history instance i; and
a selection module selecting a cluster TVC with a highest logical volume instance affinity as a TVC for the logical volume.

2. The apparatus of claim 1, wherein all operations for a virtual tape drive mounting the logical volume are routed to the selected cluster TVC.

3. The apparatus of claim 1, wherein each access history instance comprises a last write time stamp, a last read time stamp, a last scratch mount time stamp, a last TVC read time stamp, a last TVC write time stamp, and a last TVC scratch mount time stamp.

4. A memory device storing a computer readable program executed on a processor, wherein the computer readable program when executed on the processor causes the processor to:
maintain access history instances for a plurality of clusters, each cluster comprising a TVC;
receive an access request for a logical volume wherein an instance of the logical volume is stored on each of the plurality of clusters and each instance of the logical volume is synchronized with each other instance of the logical volume;
weight the access history instances in favor of recent access history instances;
calculate an affinity of the logical volume instance stored on each cluster of the plurality of clusters, wherein each affinity a is calculated as $$a = \sum_{i=1}^{n} \frac{k}{(t_0 - t_i)}$$

where n is a number of access history instances, k is a constant, $t_0$ is a current time, and $t_i$ is a last read time stamp for access history instance i; and
select a cluster TVC with a highest logical volume instance affinity as a TVC for the logical volume.

5. The memory device of claim 4, wherein the computer readable program further causes the processor to route all operations for a virtual tape drive mounting the logical volume to the selected cluster TVC.

6. The memory device of claim 4, wherein each access history instance comprises a last write time stamp, a last read time stamp, a last scratch mount time stamp, a last TVC read time stamp, a last TVC write time stamp, and a last TVC scratch mount time stamp.

7. The memory device of claim 4, wherein the computer readable program further causes the processor to filter out unavailable clusters.

8. The memory device of claim 4, wherein the computer readable program further causes the processor to filter out clusters that are anticipated to be unavailable.

9. The memory device of claim 4, wherein the computer readable program further causes the processor to filter out clusters which have copies of the logical volume that are inconsistent and the access is not scratch based.

10. The memory device of claim 4, wherein the computer readable program further causes the processor to exclude all access history instances and consistency checks for scratch mounts when calculating each affinity.

11. The memory device of claim 4, wherein the computer readable program further causes the processor to calculate the affinity using read/write/scratch granularity.

12. A system for selecting a TVC, the system comprising:
a plurality of clusters, each cluster comprising a TVC and a virtual tape drive, wherein all operations for the virtual tape drive mounting the logical volume are routed to the TVC;
a cluster manager with a processor and memory executing computer readable programs comprising
a history module maintaining access history instances for a plurality of clusters;
a request module receiving an access request for a logical volume wherein an instance of the logical volume is stored on each of the plurality of clusters and each instance of the logical volume is synchronized with each other instance of the logical volume;
an adjustment module weighting the access history instances in favor of recent access history instances;
a calculation module calculating an affinity of the logical volume instance stored on each cluster of the plurality of clusters, wherein each affinity a is calculated as $$a = \sum_{i=1}^{n} \frac{k}{(t_0 - t_i)}$$

where n is a number of access history instances, k is a constant, $t_0$ is a current time, and $t_i$ is a last read time stamp for access history instance i; and
a selection module selecting a cluster TVC with a highest logical volume instance affinity as a TVC for the logical volume.

13. The system of claim 12, wherein each access history instance comprises a last write time stamp, a last read time stamp, a last scratch mount time stamp, a last TVC read time stamp, a last TVC write time stamp, and a last TVC scratch mount time stamp.

14. A method for deploying computer infrastructure, comprising integrating a memory device storing a computer readable program into a computing system, wherein the computer readable program executed on the computing system performs the following:
- maintaining access history instances for a plurality of clusters, each cluster comprising a TVC;
- receiving an access request for a logical volume wherein an instance of the logical volume is stored on each of the plurality of clusters and each instance of the logical volume is synchronized with each other instance of the logical volume;
- weighting the access history instances in favor of recent access history instances;
- calculating an affinity of the logical volume instance stored on each cluster of the plurality of clusters, wherein each affinity a is calculated as $$a = \sum_{i=1}^{n} \frac{k}{(t_0 - t_i)}$$

where n is a number of access history instances, k is a constant, $t_0$ is a current time, and $t_i$ is a last read time stamp for access history instance i;
- filtering out unavailable clusters and clusters that are anticipated to be unavailable; and
- selecting a cluster TVC with a highest logical volume instance affinity as a TVC for the logical volume.

* * * * *